(12) United States Patent
Meyer et al.

(10) Patent No.: US 6,773,766 B2
(45) Date of Patent: Aug. 10, 2004

(54) UTILIZATION OF POLYMERIZABLE LIQUID CRYSTAL SUBSTANCES FOR THE PRODUCTION OF OPTICAL COMPONENTS

(75) Inventors: Frank Meyer, Heidelberg (DE); Norbert Schneider, Altrip (DE); Peter Schuhmacher, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/430,322

(22) Filed: May 7, 2003

(65) Prior Publication Data

US 2003/0219548 A1 Nov. 27, 2003

Related U.S. Application Data

(63) Continuation of application No. 09/857,216, filed as application No. PCT/EP99/10294 on Dec. 22, 1999, now abandoned.

(30) Foreign Application Priority Data

Dec. 22, 1998 (DE) ......................................... 198 59 584

(51) Int. Cl.⁷ ............................................... C09K 19/00
(52) U.S. Cl. ................... 428/1.1; 428/1.4; 252/299.67; 349/183; 349/193
(58) Field of Search ................... 252/299.01–299.67; 428/1.1, 1.4; 349/56, 183, 193, 194, 196, 197, 201, 202

(56) References Cited

U.S. PATENT DOCUMENTS

| | | | |
|---|---|---|---|
| 3,679,290 A | | 7/1972 | Adams et al. |
| 5,486,935 A | | 1/1996 | Kalmanash |
| 5,506,704 A | | 4/1996 | Broer et al. |
| 5,683,622 A | | 11/1997 | Kraetzschmar et al. |
| 5,744,057 A | * | 4/1998 | Meyer et al. ............ 252/299.01 |
| 5,751,384 A | | 5/1998 | Sharp |
| 5,762,823 A | | 6/1998 | Hikmet |
| 5,780,629 A | | 7/1998 | Etzbach et al. |
| 5,793,456 A | | 8/1998 | Broer et al. |
| 5,822,029 A | | 10/1998 | Davis et al. |
| 5,825,444 A | | 10/1998 | Broer et al. |
| 5,833,880 A | * | 11/1998 | Siemensmeyer t al. .................. 252/299.64 |
| 5,886,242 A | | 3/1999 | Etzbach et al. |
| 5,948,831 A | | 9/1999 | Broer et al. |
| 6,193,937 B1 | | 2/2001 | Broer et al. |
| 2001/0001509 A1 | | 5/2001 | Broer et al. |

FOREIGN PATENT DOCUMENTS

| | | | | |
|---|---|---|---|---|
| DE | 43 42 280 | | 6/1995 | |
| DE | 44 08 171 | | 9/1995 | |
| DE | 195 20 704 | | 12/1996 | |
| EP | 0 685 749 | | 12/1995 | |
| EP | 747 382 | | 12/1996 | |
| EP | 0 859 969 | | 8/1998 | |
| EP | 0 634 674 | | 3/1999 | |
| EP | 0 606 940 | | 4/1999 | |
| EP | 0 720 041 | | 4/2003 | |
| GB | 2 315 072 | | 1/1998 | |
| GB | 2 321 529 | | 7/1998 | |
| GB | 2 324 382 | | 10/1998 | |
| GB | 2 328 436 | | 2/1999 | |
| GB | 2 330 139 | * | 4/1999 | ......... C07D/493/04 |
| WO | WO 96/02016 | | 1/1996 | |
| WO | WO 97/00600 | | 1/1997 | |
| WO | WO 98/08135 | | 2/1998 | |
| WO | WO 98/43225 | | 10/1998 | |

OTHER PUBLICATIONS

Derwent Abstract, AN 97–023090, DE 195 20 660, Jun. 9, 1995, (corr. EP 747 382 = see ref. AW).
Derwent Abstract, AN 1998–471209, JP 10–197722, Jul. 31, 1998.
M. L. Tsai, et al., Appl. Phys. Lett., vol. 54, No. 24, pp. 2395–2397, "Optical Notch Filter Using Thermotropic Liquid Crystalline Polymers", Jun. 12, 1989.
R. Mauer, et al., SID International Symposium Digest of Technical Papers, First Edition, pp. 110–113, "Polarizing Color Filters Made From Cholesteric LC–Silicones", May 1990.

\* cited by examiner

*Primary Examiner*—Mark F. Huff
*Assistant Examiner*—Jennifer R. Sadula
(74) *Attorney, Agent, or Firm*—Oblon, Spivak, McClelland, Maier & Neustadt, P.C.

(57) ABSTRACT

The present invention relates to the use of polymerizable liquid-crystalline compounds for the production of optical elements having color- and polarization-selective reflection, and to optical elements comprising these compounds in monomeric or polymerized form.

15 Claims, 1 Drawing Sheet

Fig. 1

UTILIZATION OF POLYMERIZABLE LIQUID CRYSTAL SUBSTANCES FOR THE PRODUCTION OF OPTICAL COMPONENTS

BACKGROUND OF THE INVENTION

1. Field of the Invention

The present invention relates to the use of special polymerizable liquid-crystalline compounds for the production of optical elements having color- and polarization-selective reflection, and to optical elements comprising these compounds in monomeric or polymerized form. The present invention furthermore relates to the use of liquid-crystalline compositions comprising at least one of these compounds and, if desired, one or more chiral compounds for the production of optical elements having color- and polarization-selective reflection.

2. Description of the Background

Numerous compounds are not converted directly into the liquid, unordered state on warming from the crystalline state with a defined short-range and long-range order of the molecules, but instead pass through a liquid-crystalline phase, in which, although the molecules are mobile, the axes of the molecules form, however, an ordered structure. Extended molecules frequently form nematic liquid-crystalline phases, which are characterized by a long-range alignment order through parallel arrangement of the longitudinal axes of the molecules. If a nematic phase of this type comprises chiral compounds, a so-called cholesteric phase forms, which is characterized by a helical superstructure of the longitudinal axes of the molecules. The chiral compound here can be the liquid-crystalline compound itself or it can be added to a nematic liquid-crystalline phase as a chiral dopant.

Liquid-crystalline materials have remarkable optical properties based on their anisotropic ordered state. However, the liquid-crystalline ordered state only occurs in a limited temperature range. The temperature range in which liquid-crystalline phases occur is frequently well above the desired service temperature or extends only over a small temperature range.

There are various ways of obtaining and fixing the order structures desired for the material properties, even in the solid state. Besides glass-like solidification during cooling from the liquid-crystalline state, there is the possibility of copolymerization into polymeric networks or, in the case where the liquid-crystalline compounds contain polymerizable groups, of polymerization of the liquid-crystalline compounds themselves.

The cholesteric liquid-crystalline phase has remarkable properties which make the use of cholesteric liquid crystals or mixtures having cholesteric phases appear suitable for use as color filters and polarizers.

Cholesteric liquid crystals can be converted into a twisted structure by suitable alignment methods. The direction of rotation can be either left-handed or right-handed, depending on the chiral component used. This twisted arrangement of the liquid-crystal molecules results in the known selective reflection of the cholesteric liquid crystals (see, for example, H. Kelker, R. Matz, Handbook of Liquid Crystals, Verlag Chemie, Weinheim, 1980, Chapter 7, pp. 293 ff.): circular-polarized light whose wavelength and direction of rotation correspond to the pitch of the liquid crystal is completely reflected. Circular-polarized light with the opposite direction of rotation or with a different wavelength can pass through the cholesteric liquid crystal unhindered.

Accordingly, as regards white unpolarized light, which contains all wavelengths and polarization states, only a narrow circular-polarized band is reflected. Cholesteric liquid crystals can therefore be employed as wavelength-selective reflectors or polarizers. In particular, the possibility of achieving reflection wavelengths from near ultra-violet to well into the infra-red wavelength region through a suitable choice of the type and proportion of chiral groups in the cholesteric liquid crystal is an extraordinary advantage of cholesteric liquid crystals.

The use of cholesteric liquid crystals for the production of color filters and polarizers is disclosed, for example, in U.S. Pat. No. 3,679,290 and R. Maurer, D. Andrejewski, F.-H. Kreuzer, A. Miller, Polarizing Color Filters Made from Cholesteric LC-Silicones, SID Digest 1990, pp. 110–113 and M. L. Tsai, S. H. Chen, S. D. Jacobs, Optical Notch Filters using Thermotropic Liquid Crystalline Polymers, Appl. Phys. Lett. 1989, 24(54), pp. 2395–2397, and EP 0 685 749 B1.

Furthermore, the following specifications describe the use of cholesteric liquid crystals for the formation of optical elements: JP 10197722 A, WO 98/43225, EP 0 859 969, U.S. Pat. No. 5,793,456, GB 2,324,382, U.S. Pat. No. 5,825,444, EP 0 720 041, EP 0 634 674, GB 2,321,529, U.S. Pat. No. 5,762,823, U.S. Pat. No. 3,679,290, U.S. Pat. No. 5,751,384, GB 2,315,072.

For the production of optical components, it is necessary to align the cholesteric liquid crystals or mixtures having a cholesteric phase using suitable methods and to fix them after alignment has taken place. Alignment of the liquid crystals is generally carried out at elevated temperatures in the region of the cholesteric phase by mechanical shear of a cholesteric film between two glass plates. These glass plates are frequently additionally provided with alignment layers, which are intended to ensure defect-free alignment. These alignment layers generally consist of rubbed polyimide layers or polyvinyl alcohol, or electric or magnetic fields are additionally applied in order to ensure good alignment. The crucial factor influencing the rate of alignment is the viscosity of the cholesteric substance used. The cholesteric phase can be fixed by freezing a monomer mixture having a cholesteric phase by a fast crosslinking reaction, such as a photopolymerization. Alternatively, however, polymers of cholesteric materials can also be preserved by supercooling into the glass phase. For use of cholesteric liquid crystals in optical elements, it is necessary that suitable materials can be aligned in processes which can be automated and which can be used on large areas, in such a way that defect-free cholesteric films can be obtained. The multidomains usually obtained adversely affect the optical quality of the films and mean that the high requirements made of optical elements, such as high reflectivity for strictly right-handed or left-handed circular-polarized light, can no longer be met. Furthermore, high requirements are made of optical components in respect of heat and light stability. Thus, the temperatures of up to 200° C. to which optical components, such as polarizers, notch filters, colored filters and compensation films, are subjected briefly during display production must not affect the optical quality of the components. In this respect, the optical elements known from the prior art still do not have completely satisfactory properties.

For the production of optical elements, the aim was therefore to find materials which, besides ready alignability at the lowest possible temperatures, produce high stability of the polymerized films during processing, with excellent optical properties. In particular, materials should be provided which permit the production of optical elements having improved temperature stability.

SUMMARY OF THE INVENTION

We have found that these objects are surprisingly achieved by using polymerizable liquid-crystalline compounds of the general formula I

$$Z^1-Y^1-A^1-Y^3-M-Y^4-A^2-Y^2-Z^2 \qquad I,$$

in which
- $Z^1$ and $Z^2$, independently of one another, are a radical containing reactive, polymerizable groups;
- $Y^1-Y^4$, independently of one another are a single chemical bond, —O—, —S—, —O—CO—, —CO—O—, —O—CO—O—, —CO—NR—, —NR—CO—, —O—CO—NR—, —NR—CO—O— or —NR—CO—NR—, where at least one of the groups $Y^3$ and $Y^4$ is —O—CO—O—, —O—CO—NR—, —NR—CO—O— or —NR—CO—NR—, and R is $C_1-C_4$-alkyl;
- $A^1$ and $A^2$, independently of one another, are a spacer having 2 to 30 carbon atoms, in which the carbon chain may be interrupted by ether oxygen, thioether sulfur or by non-adjacent imino or $C_1-C_4$-alkylimino groups; and,
- M is a mesogenic group;

for the production of optical elements having color- and/or polarization-selective reflection.

The term polymerization here is taken to mean all polymer synthesis reactions, i.e. addition polymerizations as chain reactions, addition polymerizations as step reactions and condensation polymerizations.

Preferred radicals $Z^1$ and $Z^2$ are the following:

where the radicals R are $C_1-C_4$-alkyl, such as, for example, methyl, ethyl, n- or i-propyl or n-, i- or t-butyl, and may be identical or different.

DETAILED DESCRIPTION OF THE PREFERRED EMBODIMENTS

Of the reactive polymerizable groups, the cyanates can trimerize spontaneously to give cyanurates and should therefore be mentioned preferentially. Compounds containing epoxide, thiirane, aziridine, isocyanate and isothiocyanate groups require further compounds containing complementary reactive groups for polymerization. Thus, for example, isocyanates can be polymerized with alcohols to give urethanes and with amines to give urea derivatives. An analogous situation applies to thiiranes and aziridines. The complementary reactive groups can either be present in a second compound according to the invention, which is mixed with the first, or can be introduced into the polymerization mixture by means of auxiliary compounds containing two or more of these complementary groups. If these compounds each contain two of these reactive groups, linear polymers having a predominantly thermoplastic character are formed. If the compounds contain more than two reactive groups, crosslinked polymers, which have particularly high mechanical stability, are formed. The maleimido group is particularly suitable for free-radical copolymerization with olefinic compounds, such as styrene.

Preferred polymerizable groups $Z^1$ and $Z^2$ are those which can undergo free-radical polymerization, i.e., in particular, olefinically unsaturated groups, and of these, the groups are of particular importance in combination with $Y^1$ and $Y^2$.

The moieties $Z^1$, $Z^2$, $A^1$, $A^2$, M and X present in the compounds according to the invention can be linked to one another via bridging units $Y^1-Y^4$, such as —O—, —S—, —CO—O—, —O—CO—, —O—CO—O—, —CO—NR—, —NR—CO—, —O—CO—NR—, —NR—CO—O—, —NR—CO—NR— or alternatively via a direct bond, where preferably at least one link of the spacer $A^1$ or $A^2$ to the mesogenic group takes place via a carbonate group (—OCOO—), a carbamate group (—O—CO—NR— or —NR—CO—O—) or a urea group (—NR—CO—NR—). Chiral polymerizable compounds containing one of these groups have the advantageous property of particularly low phase-transition temperatures and broad phase ranges and are thus particularly suitable for applications at room temperature. This applies in particular to the carbonate group.

Suitable spacers $A^1$ and $A^2$ can be all groups known for this purpose. The spacers generally contain from 2 to 30 carbon atoms, preferably from 3 to 12 carbon atoms, and consist of predominantly linear aliphatic groups. They can be interrupted in the chain, for example by non-adjacent oxygen or sulfur atoms or imino or alkylimino groups, such as methylimino groups. Suitable substituents for the spacer chain are furthermore fluorine, chlorine, bromine, cyano, methyl and ethyl.

Examples of representative spacers are the following:

where
- m is from 1 to 3 and p is from 1 to 12.

The radicals M can be any known mesogenic groups. Particularly suitable are groups of the formula Ia $$-(-T-Y^5-)_r-T- \qquad Ia$$

in which the variables having the following meanings:
- T is a divalent saturated or unsaturated iso- or heterocyclic radical,

$Y^5$ is a bridging unit as defined for $Y^1$–$Y^4$; —CH$_2$—O—; —O—CH$_2$—; —CH=N—, —N=CH— or —N=N—, r is 0, 1, 2 or 3, where the radicals T and $Y^5$ may be identical or different in the case where r>0.

r is preferably 1 or 2.

The radicals T can also be ring systems substituted by fluorine, chlorine, bromine, cyano, hydroxyl or nitro. Preferred radicals T are the following:

Preferred mesogenic groups M are, for example, the following:

Particularly preferred mesogenic groups M are those of the following formulae:

where each ring can carry up to three identical or different substituents from the following group:

$C_1$–$C_{20}$-alkyl, $C_1$–$C_{20}$-alkoxy, $C_1$–$C_{20}$-alkoxycarbonyl, $C_1$–$C_{20}$-mono-alkylaminocarbonyl, $C_1$–$C_{20}$-alkylcarbonyl, $C_1$–$C_{20}$-alkylcarbonyloxy, $C_1$–$C_{20}$-alkylcarbonylamino, formyl, halogen, cyano, hydroxyl or nitro.

Preferred substituents for the aromatic rings, besides fluorene, chlorine, bromine, cyano, formyl and hydroxyl, are, in particular, short-chain aliphatic radicals, such as methyl, ethyl, n-propyl, isopropyl, n-butyl, isobutyl, tert-butyl and alkoxy, alkoxycarbonyl, alkylcarbonyl, alkylcarbonyloxy, alkylcarbonylamino and monoalkylaminocarbonyl radicals containing these alkyl groups.

The outer benzene rings in the particularly preferred groups M preferably have the following substitution pattern:

or they are substituted analogously by F, Br, $CH_3$, $OCH_3$, CHO, $COCH_3$, $OCOCH_3$ or CN instead of Cl, where the substituents can also be present in mixed form. Mention should furthermore be made of the structures where s is from 2 to 20, preferably from 8 to 15.

The preferred substitution patterns of the central benzene ring in the particularly preferred groups M are as follows:

Preferred compounds I according to the invention are also those in which the pairs of radicals $Z^1$ and $Z^2$, $Y^1$ and $Y^2$, $Y^3$ and $Y^4$, and $A^1$ and $A^2$ are in each case identical.

Very particular preference is given to the mesogenic group M of the following formula Mixtures of the compounds I according to the invention can also be prepared. Such mixtures usually have reduced viscosity compared with the pure mixture components and generally have lower liquid-crystalline phase temperatures, in some cases making them suitable for applications at room temperature.

In the mixtures of the compounds according to the invention, it is possible for not only, for example, "tricyclic", optionally ring-substituted, mesogenic groups M of the formula (where, in the formula Ia,

T are three identical substituted or unsubstituted radicals and r is 2)

to occur as moieties, but also, for example "bicyclic" groups M of the formulae (where, in the formula Ia,

$Y^5$ is a single chemical bond,
T are different radicals (unsaturated isocyclic) and (saturated heterocyclic), and
r is 1)
or (where, in the formula Ia,
Y$^5$ is a single chemical bond, T are different radicals (unsaturated isocyclic) and

(unsaturated heterocyclic), and
r is 1).

Particularly preferred "bicyclic" mesogenic groups M are the fragments which may additionally be substituted on the aromatic rings, as described above.

Particular preference is given to the use of nematic compounds of the formula I in which M is Z$^1$ and Z$^2$ are H$_2$C=CH—, and
A$^1$, A$^2$ and Y$^1$ to Y$^4$ are as defined above.

A non-limiting example of such a compound is one of the formula

Liquid-crystal compositions comprising one or more compounds of the formula I can additionally also comprise one or more chiral compounds. This results in the formation of cholesteric liquid-crystalline phases which have, in particular, interesting optical properties and, for example, reflect light of different wavelength depending on the viewing angle. Liquid-crystal compositions of this type are particularly suitable for use in optical elements.

Particularly suitable chiral components are those which have firstly a high twisting power and secondly are readily miscible with the liquid-crystalline compounds without adversely affecting the liquid-crystalline phase structure.

Preferred chiral compounds are, for example, those of the general formulae Ib, Ic, Id and Ie

| (Z$^1$—Y$^5$)$_n$X | Ib, | (Z$^1$—Y$^1$—A$^1$—Y$^5$)$_n$X | Ic, |
|---|---|---|---|
| (P$^1$—Y$^5$)$_n$X | Id | (Z$^1$—Y$^1$—A$^1$—Y$^3$—M—Y$^4$)$_n$X | Ie, | where the variables A$^1$, Z$^1$, Y$^1$, Y$^3$, Y$^4$, Y$^5$ and n are as defined above for the formula I, P$^1$ is a radical selected from hydrogen, C$_1$–C$_{30}$-alkyl, C$_1$–C$_{30}$-acyl, C$_3$–C$_8$-cycloalkyl, unsubstituted or substituted by one to three C$_1$–C$_6$-alkyl and where the carbon chain of the alkyl, acyl and cycloalkyl radicals may be interrupted by ether oxygen, thioether sulfur or by non-adjacent imino or C$_1$–C$_4$-alkylimino groups, n is a number from 1 to 6, and X is an n-valent chiral radical.

The radicals X are, for example:

These and other preferred chiral components are mentioned, for example, in DE-A 43 42 280 and in the earlier German patent applications 19520660.6 and 19520704.1.

A further preferably used group comprises chiral compounds of the formula Ic or Ie, in which n is 2, $Z^1$ is $H_2C=CH-$ and X is a chiral radical of the formula and $A^1$, $Y^1$, $Y^3$, $Y^4$, $Y^5$ and M are as defined above.

Particularly preferred chiral components are the following compounds (A) to (G):

where

L is $C_1$- to $C_4$-alkyl, $C_1$–$C_4$-alkoxy, halogen, COOR, OCOR, CONHR or NHCOR, and R is $C_1$–$C_4$-alkyl.

(The terminal dashes in the above formulae indicate the free valences).

Particular preference is given, for example, to the following:

(A)

(B)

(C)

(D)

-continued (E)

(F)

(G)

If the above non-chiral compounds are used in combination with the above chiral compounds, the molar ratio between the non-chiral compound of the formula I and the chiral compound of the formula Ib, c, d or e is in the range from about 1:0.01 to 1:0.3, in particular 1:0.01 to 1:0.25.

Polymerization of the compounds or liquid-crystal compositions according to the invention allows the liquid-crystalline ordered state to be fixed. The polymerization can be carried out, for example, thermally or photochemically, depending on the polymerizable group. Other monomers can also be copolymerized together with the compounds or liquid-crystal compositions according to the invention. These monomers can be other polymerizable liquid-crystalline compounds, chiral compounds, which are likewise preferably copolymerized covalently, or conventional crosslinking agents, such as polyvalent acrylates, vinyl compounds or epoxides. Especially in the case of isocyanates, isothiocyanates or epoxides as polymerizable liquid-crystal compounds, the crosslinking agent is preferably a polyvalent alcohol, meaning that, for example, urethanes can be formed. The crosslinking agent must be matched in its amount to the polymerization conditions in such a way that firstly satisfactory mechanical stability is achieved, but secondly the liquid-crystalline phase behavior is not impaired. The amount of crosslinking agent therefore depends on the specific application of the polymers. For the preparation of pigments, a relatively large amount of crosslinking agent is advantageous, while for the production of thermoplastic layers or, for example, for display alignment layers, a relatively small amount of crosslinking agent is necessary. The amount of crosslinking agent can be determined by a few preliminary experiments.

A further modification of the polymerization products prepared from the compounds or liquid-crystal compositions according to the invention is possible by addition of polymeric auxiliaries before the polymerization. Auxiliaries of this type should preferably be soluble either in the starting mixtures or alternatively in an organic solvent which is compatible with the starting mixtures. Typical representatives of polymeric auxiliaries of this type are, for example, polyesters, cellulose esters, polyurethanes and polyether- or polyester-modified or even unmodified silicones. The amount of polymeric auxiliary to be added, where appropriate, for the desired purpose, its chemical nature and possibly also the amount and nature of a solvent are generally known to the person skilled in the art or can likewise be determined experimentally by means of a few preliminary experiments.

Besides the compounds of the formulae I and Ib to Ie, further compounds which are incorporated non-covalently into the polymeric network can also be admixed. These can be, for example, commercially available nematic liquid crystals.

Further additives can also be pigments, dyes and fillers.

The pigments can be inorganic compounds, for example iron oxides, titanium oxide and carbon black, and the organic compounds can be, for example, pigments or dyes from the classes of the monoazo pigments, monoazo dyes and metal salts thereof, disazo pigments, condensed disazo pigments, isoindoline derivatives, derivatives of naphthalene- or perylenetetracarboxylic acid, anthraquinone pigments, thioindigo derivatives, azomethine derivatives, quinacridones, dioxazines, pyrazoloquinazolones, phthalocyanine pigments or basic dyes, such as triarylmethane dyes and salts thereof.

For the purposes of the present invention, the term optical elements is taken to mean all articles which utilize the optical properties of nematic and/or cholesteric liquid crystals. Specifically, these can be, by way of example, retardation films, notch filters, colored filters for displays, polarizers, but also simple mirrors for decorative purposes. The three-dimensional shape of the optical elements can be planar, but also with a concave or convex curve. As a particular embodiment, the polymerized films can also be comminuted to give pigments and, after incorporation into conventional binders, applied to a support by conventional application methods, such as spraying, rolling, casting, atomizing, knife coating or printing. A preferred embodiment of the optical elements is a planar shape.

An essential factor for the quality of the optical elements is the application of the compounds of the general formula I or mixtures comprising compounds of the general formula I, since the optical quality of the layers is determined by the application method.

Suitable application methods are, in general, spraying, rolling, casting, knife coating and printing.

A preferred embodiment here is dissolution of the liquid-crystalline material in a readily volatile solvent in combination with any additives necessary. Suitable solvents here are THF, MEK, toluene, ethyl acetate and butyl acetate. Additives which can be employed are polymerization inhibitors or initiators, flow-control auxiliaries, drying aids, adhesives, etc. The isotropic solution is transferred to a substrate via a conventional applicator. After passing through a drying tunnel, in which the solvent is removed, the wet film can be fixed with the aid of UV radiation. The resultant films exhibit very high reflectivity. These films are eminently suitable as polarizers in LC displays. In one embodiment, a number of layers of such films are laminated one on top of the other by lamination processes, and, through a suitable choice of the selective wavelengths of the selected films, a polarizer can be obtained which covers light throughout the visible spectrum (EP 0 720 041).

As an alternative to a multilayer polarizer of this type, the material I can also be employed in combination with suitable compounds and processing conditions in so-called broadband polarizers. The basic procedure for this purpose is described in patent specifications WO 98/08135, EP 0 606 940-A2, GB 2,321,529 A and WO 96/02016, which are especially incorporated herein by way of reference.

Colored filters can also be produced using mixtures comprising compounds of the general formula I. To this end, the wavelengths required can be applied specifically by application methods customary to the person skilled in the art. An alternative application form uses the thermochromicity of cholesteric liquid crystals. By adjusting the temperature, the color of the cholesteric layer can be shifted from red via gray to blue. With the aid of masks, certain zones can be polymerized specifically at a defined temperature. The crucial parameter affecting the thermochromicity and the direction of rotation of light by the cholesteric mixture comprising compounds of the formula I is the choice of the chiral auxiliary. This determines the direction of rotation of reflected light and the thermochromicity of the cholesteric system.

Besides the optical properties of cholesteric phases comprising compounds of the general formula I, the nematic phase of these substances is also suitable for use in optical elements. In this case, the birefringence of a system of this type is utilized. Mention may be made here, in particular, of retardation films.

The optical elements which can be produced using the above compounds are notable in particular for improved temperature stability. This is especially important on account of the fact that optical elements, depending on their field of use, have to meet different temperature stability criteria.

For polarizers used in displays, for instance, the intention is that there should be no change in the optical and/or mechanical properties over a prolonged period (for example, for from 30 minutes to several hours, such as from 2 to 10 or from 2 to 5 hours, for example) at 100° C. and during subsequent cooling to the initial temperature. This corresponds approximately to the temperature load experienced by the display when it heats up as a result of background lighting.

Even more stringent are the requirements to be met by color filters which have to undergo higher temperatures during the production process. For instance, it is common to apply what is known as an alignment layer, based on polyimide, by polymerization. The polymerization temperature in this case is in the range from about 230 to 250° C.

Since the polymer films of the invention in the optical elements are commonly always present under glass or protective polymer films, it is enough for the temperature stability to be present substantially in the absence of air.

The temperature stability criterion of the invention is therefore met if the elements of the invention, when heated in an inert gas atmosphere, such as $N_2$, for example, to a temperature greater than or equal to 100° C., such as from 100° C. to 350° C. or from 100° C. to 250° C., for example, and cooled back down to the original temperature, such as 20° C., for example, exhibit a shift in the wavelength of the reflection maximum of less than about 40 nm.

The shift in wavelength may be caused by additional polymerization shrinkage, with the reflection wavelength being shifted toward shorter wavelength ranges as a result. Preferably, the shift is from 10 to 20 nm, or less. Particularly preferred polymer films are those which exhibit no measurable irreversible shift in reflection wavelength as a result of such a temperature treatment.

The temperature stability criterion of the invention (and hence also the optical and mechanical stability) may be determined in a simple manner by means of various techniques.

In accordance with a first method, a polymerizable mixture of polymerizable compounds is aligned between two microscope slides, polymerized with UV light, and then heated to 200° C. on a hot plate at 10° C. intervals, for example. After each interval the reflection wavelength (or transmission wavelength) is measured. It can be seen that the network expands as the temperature rises, owing to the thermal load (red shift). If the polymer is subsequently cooled at the same intervals, this process is—in the ideal case—reversible and, at room temperature, the same initial value of the reflection wavelength is obtained again. The compounds of the invention exhibit reversible behavior of this kind.

In accordance with a second method, applicable preferably to multilayer systems, the already polymerized layer or layer assembly is introduced at 230° C. or at 250° C., for example, into an oven flooded with nitrogen and, following an hour, is cooled back down to the initial temperature (e.g. 20° C.), and its spectrum is measured. Where appropriate, this process is repeated once more. In comparison with the initial spectrum before the beginning of the tests, neither a reduction in the reflection levels nor a shift in the reflection wavelengths is found in the case of the systems of the invention.

The invention will now be described in more detail by means of the following implementation examples and with reference to the attached figure.

EXAMPLE 1
Formulation for a Pourable Mixture
Principal Components:
  a) Nematic liquid crystal (nemLC): compound of the formula:

b) Chiral dopant (chirDop): compound of the formula (B)

(B)

c) Flow-control agent: Byk 361
  d) UV initiator: Irgacure 369

Formulation

| Component | Amount |
|---|---|
| NemLC | 16.125 kg |
| chirDop | variable, see below |
| Byk 361 | 8 g |
| Irgacure | 0.564 kg |
| THF | 31 kg |

Total amount: about 48 kg
Concentration (nemat.) = 33.6%

Total amount: about 48 kg
Concentration (nemat.)=33.6%

The solvent THF, if possible "fresh", i.e. peroxide-free, is introduced into a suitable stirred vessel with temperature-control and filtration devices. The nemLC and then the flow-control agent are added with stirring. The mixture is stirred for 30 minutes and then warmed to 40° C., during which everything dissolves. Any clouding is removed via a filter. After filtration, the initiator is added.

Depending on the desired color, the appropriate amount of chirDop pre-dissolved in THF is added (dopant solution: chirDop dissolved in the THF to give a 10% solution), giving the coating-ready mixture.

TABLE

Amounts of chirDop and the colors achievable therewith

| No./nm | % by wt. of dopant | No./nm | % by wt. of dopant | No./nm | % by wt. of dopant |
|---|---|---|---|---|---|
| 1/750 | 3.12 | 6/625 | 3.80 | 11/500 | 4.73 |
| 2/725 | 3.23 | 7/600 | 3.96 | 12/475 | 4.95 |
| 3/700 | 3.36 | 8/575 | 4.12 | 13/450 | 5.25 |
| 4/675 | 3.52 | 9/550 | 4.32 | 14/425 | 5.54 |
| 5/650 | 3.64 | 10/525 | 4.52 | 15/400 | 5.95 |

This solution can be applied to a suitable substrate, such as PET, PP or polyacetate, by various coating methods.

EXAMPLE 2
Preparation of a Liquid-Crystalline Polymer Film

Figure 1:
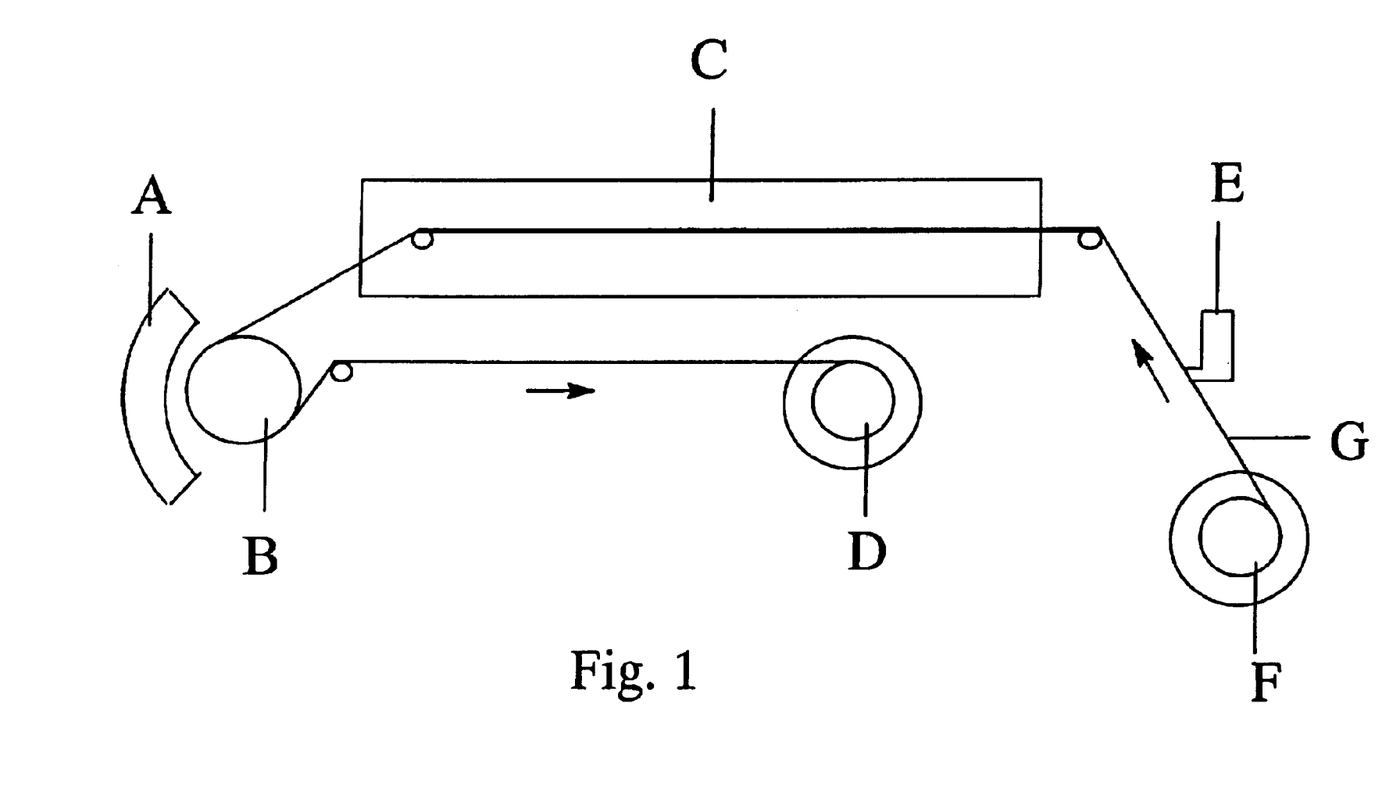
FIG. 1 shows a diagram of a coating apparatus used in accordance with the invention.

The coating is carried out essentially as described in PCT/EP 98/05544. To this end, use is made of a coating apparatus as shown schematically in FIG. 1. A polyethylene terephthalate film (PET film) (G) having a thickness of 15 $\mu$m was unrolled continuously from the film reel (F) and coated with a mixture prepared as described in Example 1 using a knife coater. The casting rate was 10 m/min (casting overpressure 0.3 bar; casting width 10 $\mu$m). Drying was carried out at 60° C. in the dryer (C). The layer was cured by UV fixing in a UV unit (A) while the dried band was passed over the cooling roll (B). The cured cholesteric layer was wound up on roll (D). The thickness of the dry cholesteric polymer layer was 2.5 $\mu$m.

The cured polymer film can be peeled off from the support and can subsequently be processed further in the conventional manner. Thus, for example, it can be laminated onto another cholesteric or non-cholesteric film; the film can also be ground to give pigments, which can then be incorporated into a binder and, for the production of optical elements according to the invention, applied to a suitable support, for example by spraying, casting, printing, etc. In addition, the cholesteric film obtained in accordance with the invention can be laminated on one or both sides with a suitable protective layer. The further-processing steps described above are based on methods known per se and do not require special explanation.

In the methods described above for determining the temperature stability, the polymer films prepared in this example exhibit no measurable irreversible change in their optical and mechanical properties.

We claim:

1. A method of producing an optical element, comprising: polymerizing a mixture of at least one polymerizable liquid-crystalline compound of formula I:

$$Z^1-Y^1-A^1-Y^3-M-Y^4-A^2-Y^2-Z^2 \tag{I},$$

in which

Z$^1$ and Z$^2$, independently of one another, are a radical containing reactive, polymerizable groups;

Y$^1$–Y$^4$, independently of one another, are a single chemical bond, —O—, —S—, —O—CO—, —CO—O—, —O—CO—O—, —CO—NR—, —NR—CO—, —O—CO—NR—, —NR—CO—O— or —NR—CO—NR, where at least one of the groups Y$^3$ and Y$^4$ is —O—CO—O—, —O—CO—NR NR—CO—O— or —NR—CO—NR—, and R is C$_1$–C$_4$-Alkyl;

A$^1$ and A$^2$ independently of one another, are a spacer having 2 to 30 carbon atoms, in which the carbon chain may be interrupted by ether oxygen, thioether sulfur or by non-adjacent imino or C$_1$–C$_4$-alkylimino groups; and, M is a mesogenic group selected from the group consisting of where each ring can carry up to three identical or different substituents selected from the group consisting of C$_{1-20}$-alkyl, C$_{1-20}$-alkoxy, C$_{1-20}$-alkoxycarbonyl, C$_{1-20}$-monoalkylaminocarbonyl, C$_{1-20}$-alkylcarbonyl, C$_{1-20}$-alkylcarbonyloxy, C$_{1-20}$-alkylcarbonylamino, formyl, halogen, hydroxyl and nitro;

in combination with at least one chiral compound of formula Ie $$(Z^1-Y^1-A^1Y^3-M-Y^4)_nX \tag{Ie},$$

wherein the variables A$^1$, Z$^1$, Y$^1$, Y$^3$, Y$^4$ and M are as defined above, n is a number ranging from 1 to 6 and x is an n-valent chiral radical, where the optical element has color- and polarization-selective reflection properties.

2. The method as claimed in claim 1, in which the chiral compound is a compound of formula Ie, in which n is 2, Z$^1$ is H$_2$C=CH—, and x is a chiral radical of the formula and

A$^1$, Y$^1$, Y$^3$, Y$^4$ and M are as defined above.

3. The method as claimed in claim 1, wherein M is

Z$^1$ and Z$^2$ are H$_2$C=CH—, and A$^1$, A$^2$ and Y$^4$ to are as defined above.

4. The method as claimed in claim 3, wherein the polymerizable liquid-crystalline compound has the formula:

5. The method as claimed in claim 3, wherein the chiral compound is a member selected from the group consisting of (A)

(B)

(C)

6. The method as claimed in claim 1, wherein the molar ratio of the chiral compound of formula I to the chiral compound of formula Ie ranges from 1:0.01 to 1:0.25.

7. The method as claimed in claim 1, wherein the optical element possesses temperature stability.

8. The method as claimed in claim 7, wherein the optical element, after heating in an inert gas atmosphere to a temperature greater than or equal to 100° C. and then cooling to the original temperature, exhibits a shift in the wavelength of the reflection maximum of less than 40 nm.

9. An optical element prepared from the method as claimed in claim 1.

10. The optical element as claimed in claim 9, which in the form of a broad-band polarizer, a multilayer polarizer, a colored filter, a retardation film, a mirror or a compensation film.

11. The optical element as claimed in claim 9, which further comprises pigments, dyes and fillers.

12. The optical element as claimed in claim 11, wherein the pigment is an inorganic pigment selected from the group consisting of iron oxides, titanium oxide and carbon black.

13. The optical element as claimed in claim 11, wherein the pigment is an organic pigment selected from the group consisting of monoazo pigments, monoazo dyes, and metal salts thereof, disazo pigments, condensed disazo pigments, isoindoline derivatives, derivatives of naphthalene- or perylenetetracarboxylic acid, anthraquione pigments, thioindigo derivatives, azomethine derivatives, quinacridones, dioxazines, pyrazoloquinazolones, phthalocyanine pigments and basic dyes.

14. The optical element as claimed in claim 9 which further comprises added nematic liquid crystals.

15. The optical element as claimed in claim 9, which further comprises polymeric auxiliaries selected from the group consisting of polyesters, cellulose esters, polyurethanes and polyether- or polyester-modified or unmodified silicones.

* * * * *